(12) United States Patent
Mizikovsky

(10) Patent No.: US 8,443,431 B2
(45) Date of Patent: May 14, 2013

(54) AUTHENTICATOR RELOCATION METHOD FOR WIMAX SYSTEM

(75) Inventor: Semyon B. Mizikovsky, Morganville, NJ (US)

(73) Assignee: Alcatel Lucent, Paris (FR)

( * ) Notice: Subject to any disclaimer, the term of this patent is extended or adjusted under 35 U.S.C. 154(b) by 358 days.

(21) Appl. No.: 12/655,842

(22) Filed: Jan. 8, 2010

(65) Prior Publication Data
US 2011/0107085 A1    May 5, 2011

Related U.S. Application Data

(60) Provisional application No. 61/280,168, filed on Oct. 30, 2009.

(51) Int. Cl.
*G06F 7/04* (2006.01)
(52) U.S. Cl.
USPC .............. 726/9; 380/247; 380/255; 380/272; 713/150; 713/168; 726/3; 726/21
(58) Field of Classification Search .......... 380/247–250, 380/255, 270, 272, 258; 713/150, 153, 155, 713/159, 168–172, 182, 185, 161; 726/2, 726/3, 21, 26, 27–30, 9, 20
See application file for complete search history.

(56) References Cited

U.S. PATENT DOCUMENTS

| | | | | |
|---|---|---|---|---|
| 7,624,433 B1 * | 11/2009 | Clark et al. | ........................ | 726/9 |
| 7,752,441 B2 * | 7/2010 | Mizikovsky et al. | ......... | 713/168 |
| 7,987,366 B2 * | 7/2011 | Blom et al. | ................... | 713/171 |
| 2003/0108199 A1 * | 6/2003 | Pinder et al. | .................. | 380/200 |
| 2004/0052377 A1 * | 3/2004 | Mattox et al. | ................ | 380/277 |
| 2005/0154889 A1 * | 7/2005 | Ashley et al. | ................ | 713/171 |
| 2007/0016780 A1 * | 1/2007 | Lee et al. | ...................... | 713/171 |
| 2007/0150744 A1 * | 6/2007 | Cheng et al. | .................. | 713/185 |
| 2007/0154016 A1 * | 7/2007 | Nakhjiri et al. | ............... | 380/270 |
| 2007/0192605 A1 * | 8/2007 | Mizikovsky et al. | ......... | 713/170 |
| 2007/0201697 A1 * | 8/2007 | Altshuller et al. | ............ | 380/247 |
| 2008/0089294 A1 * | 4/2008 | Shon et al. | ..................... | 370/331 |
| 2008/0137853 A1 * | 6/2008 | Mizikovsky et al. | ......... | 380/247 |
| 2008/0178274 A1 * | 7/2008 | Nakhjiri et al. | ................... | 726/9 |
| 2008/0227458 A1 * | 9/2008 | Wu | ............... | 455/437 |
| 2008/0253569 A1 * | 10/2008 | Lim et al. | ...................... | 380/258 |

(Continued)

FOREIGN PATENT DOCUMENTS

EP    1 954 083 A1    8/2008

OTHER PUBLICATIONS

Kim, Youngwook et al, "Enhancing Security Using The Discarded Security Information in Mobile WiMAX Networks", Global Telecommunications Conference, 2008. IEEE Globecom 2008, Piscataway, NJ USA, Nov. 30, 2008, XP031370077, pp. 1-5.

(Continued)

*Primary Examiner* — Brandon Hoffman
*Assistant Examiner* — Carlos Amorin
(74) *Attorney, Agent, or Firm* — Harness, Dickey & Pierce PLC

(57) ABSTRACT

A method is provided for Authenticator Relocation in a communication system applying an Extensible Authentication Protocol, or the like, which provides replay protection and mitigates the rogue ASN-GW problem during relocation of the Anchor Authentication, and without conducting re-authentication of the MS. The method of the invention optionally allows secure refresh of the MSK.

15 Claims, 4 Drawing Sheets

U.S. PATENT DOCUMENTS

| | | | |
|---|---|---|---|
| 2009/0019284 A1* | 1/2009 | Cho et al. | 713/170 |
| 2009/0110196 A1* | 4/2009 | Tsai et al. | 380/258 |
| 2009/0193511 A1* | 7/2009 | Noe et al. | 726/9 |
| 2009/0274302 A1* | 11/2009 | Wu et al. | 380/272 |
| 2009/0280774 A1* | 11/2009 | Patel et al. | 455/410 |
| 2009/0282243 A1* | 11/2009 | Rose et al. | 713/159 |
| 2009/0282253 A1* | 11/2009 | Rose et al. | 713/172 |
| 2009/0307496 A1* | 12/2009 | Hahn et al. | 713/171 |
| 2010/0046467 A1* | 2/2010 | Chiou et al. | 370/331 |
| 2010/0167747 A1* | 7/2010 | Karnam et al. | 455/450 |
| 2010/0180111 A1* | 7/2010 | Hahn et al. | 713/150 |
| 2010/0184407 A1* | 7/2010 | Tachikawa | 455/411 |
| 2010/0205442 A1* | 8/2010 | Han et al. | 713/171 |
| 2010/0205448 A1* | 8/2010 | Tarhan et al. | 713/185 |
| 2010/0232606 A1* | 9/2010 | Lee et al. | 380/270 |
| 2010/0235900 A1* | 9/2010 | Robinton et al. | 726/9 |
| 2010/0325714 A1* | 12/2010 | Iyer et al. | 726/8 |
| 2011/0004754 A1* | 1/2011 | Walker et al. | 713/168 |
| 2011/0041003 A1* | 2/2011 | Pattar et al. | 714/4.3 |
| 2011/0047382 A1* | 2/2011 | Wang et al. | 713/170 |
| 2011/0063997 A1* | 3/2011 | Gras et al. | 370/254 |
| 2011/0076987 A1* | 3/2011 | Lee et al. | 455/411 |
| 2011/0149926 A1* | 6/2011 | Li et al. | 370/338 |
| 2011/0238834 A1* | 9/2011 | Nair et al. | 709/225 |
| 2011/0302646 A1* | 12/2011 | Ronda et al. | 726/9 |
| 2011/0307949 A1* | 12/2011 | Ronda et al. | 726/9 |
| 2012/0066757 A1* | 3/2012 | Vysogorets et al. | 726/9 |

OTHER PUBLICATIONS

International Search Report dated May 25, 2011 (PCT/US2010/054426) 5 sheets.

* cited by examiner

AUTHENTICATOR RELOCATION METHOD FOR WIMAX SYSTEM

RELATED APPLICATIONS

This application claims priority pursuant to 35 U.S.C. Sec 119(e) to U.S. Provisional Application No. 61/280,168, filed Oct. 30, 2009, entitled "AUTHENTICATOR RELOCATION METHOD FOR WIMAX SYSTEM," the subject matter thereof being fully incorporated herein by reference.

FIELD OF THE INVENTION

The present invention generally relates to authentication between mobile terminals and base stations in wireless communication systems.

BACKGROUND OF THE INVENTION

The WiMAX Forum defines specifications for network support of the IEEE 802.16e based radio interface. As of the date of filing this application, the current releases of these specifications are described in the Stage 2 [WMF-T32-005-R010v04_Network-Stage2] and Stage 3 [WMF-T33-004-R010v04_Network-Stage3] documents published by the WiMAX Forum.

To provide communications security in a WiMAX wireless system, a security association is maintained between the mobile terminal and the serving network. This security association is created with the assistance of the subscriber's home network during initial subscription authentication of the user terminal entering the network, and subsequently can be refreshed during re-authentication events. Optimal allocation of system resources during such re-authentication events constitutes an on-going issue.

SUMMARY OF INVENTION

A method is provided for Authenticator Relocation in a communication system that typically applies an Extensible Authentication Protocol, or the like, which provides replay protection and mitigates the rogue ASN-GW problem during relocation of the Anchor Authentication, and without conducting re-authentication of the MS. In one embodiment of the invention an application of a counter value is provided as a token in messages exchanged among elements of the authentication protocol for relocation of the authenticator. In another embodiment of the invention, an application is provided for a secure refresh of the Master Session Key without conducting re-authentication.

BRIEF DESCRIPTION OF THE FIGURES

The teachings of the present invention can be readily understood by considering the following detailed description in conjunction with the accompanying drawings, in which.

DETAILED DESCRIPTION

In the following description, for purposes of explanation and not limitation, specific details are set forth such as particular architectures, interfaces, techniques, etc., in order to provide a thorough understanding of illustrative embodiments of the invention. However, it will be apparent to those skilled in the art that the invention may be practiced in other illustrative embodiments that depart from these specific details. In some instances, detailed descriptions of well-known devices, circuits, and methods are omitted so as not to obscure the description of described embodiments with unnecessary detail. All principles, aspects, and embodiments, as well as specific examples thereof, are intended to encompass both structural and functional equivalents thereof. Additionally, it is intended that such equivalents include both currently known equivalents as well as equivalents developed in the future.

The invention is described hereafter in terms of a WiMAX application. It should be clear, however, that the invention will be applicable to in other wireless systems, and that the use the WiMAX application in the description following is solely for purposes of illustrating the invention principles, and is not in any way intended to limit the scope of the invention.

Figure 1:
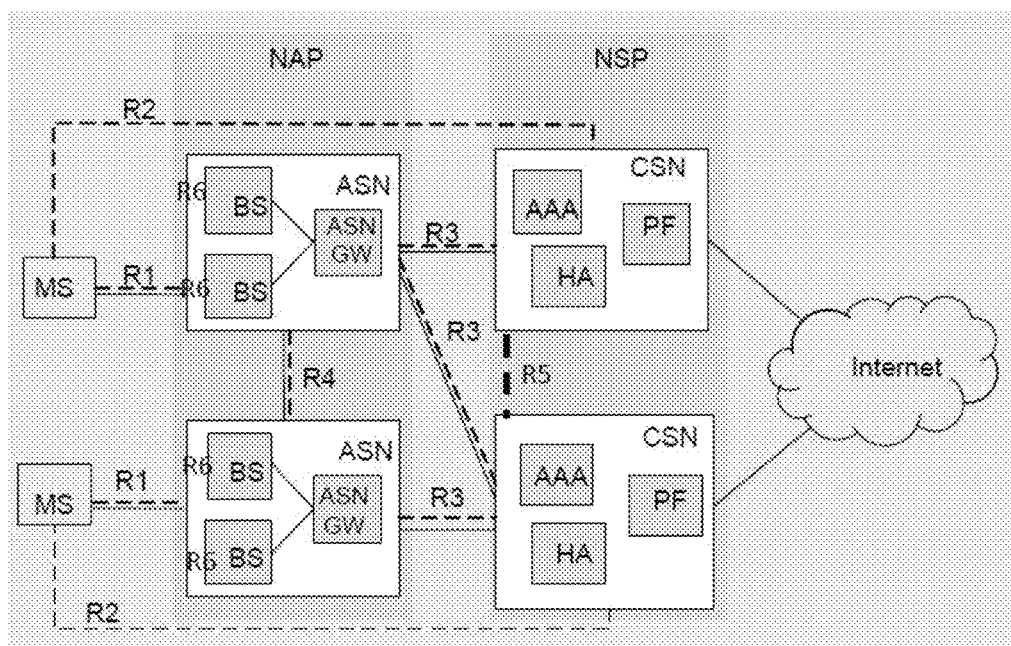
FIG. 1 depicts a system architecture in which example embodiments may be implemented.

FIG. 1 depicts a system architecture in which the inventive method disclosed herein may be implemented. That figure corresponds to the typical Network Reference Model shown on FIGS. 6-5 of WiMAX standard WMF-T32-005-R010v04_Network-Stage2. As illustrated in FIG. 1 mobile stations (MS) are connected to a Network Access Point (NAP) over interface R1 and to a network service provider (NSP) over interface R2, the NAPs are connected to each other over interface R4. Each NAP provides radio access functionality including acting as an Access Service Network (ASN) having base stations (BS) and an ASN gateway (ASN GW). Each NSP provides IP connectivity services including acting as a connectivity service network (CSN) having a home agent (HA), policy functions (PF) and a Authentication, Authorization, and Accounting (AAA) server. R5 defines an optional interface between the CSNs of different NSP such that a roaming subscriber may get Internet connectivity directly from the visited NSP or from their home NSP over the optional R5 interface.

In wireless communication systems, a security mechanism is generally applied to assure that only authorized users are provided access to the communication system. The protocol carried out to implement such security mechanisms is generally characterized as authentication, and commonly is divided among three entities:

(1) a supplicant or client (MS), requesting access to the communication system, (2) an authenticator (ASN-GW) that operates as a gatekeeper for access to the communications network in the WiMAX system and (3) an authentication server (AAA) that determines if the supplicant (MS) is authorized based on an exchange of authentication messages (usually encrypted with one of more keys) between the supplicant and the authentication server.

In many wireless communication systems, including WiMAX, authentication is implemented using Extensible Authentication Protocol (EAP). As described in the WiMAX security framework, Sec.7.3, and in particular, Sec.7.3.8, with successful completion of the EAP-based authentication protocol, both the mobile station (MS) and the Home AAA (HAAA) server generate the secret Master Session Key (MSK). This key is sent by the HAAA to the Authenticator function in the Serving System ASN-GW.

This MSK security association is further used to create multiple lower level security keys for information encryption, integrity protection, etc.

The Authenticator function in the ASN-GW is anchored and may remain static for a substantial period of time, while the MS is served by Base Stations (BS) within the realm of the Serving ASN. The Authenticator may also remain anchored if the MS roams into a neighboring ASN, as long as that ASN belongs in a fully trusted domain of the same operator. However, as the MS hands over to another ASN crossing the trust boundary, over the R4 interface reference point (as shown in FIG. 1), the security framework prescribes a re-authentication of the MS.

As a result of re-authentication, the new ASN-GW assumes Authenticator responsibilities, and receives the new MSK. In effect, such re-authentication causes relocation of the Authenticator.

In a dynamic high mobility environment, rapid movements of the MS will cause frequent handovers between neighboring ASNs, and thus will require frequent relocations of the Authenticator function from one ASN-GW to another. Conducting such repeated re-authentications imposes additional burden on the backhaul network, AAA infrastructure, and, more importantly, on the Air Interface.

For example, consider an MS that roams from one ASN to another while in the Idle mode, i.e., not actively communicating with the serving system. In order to conduct the re-authentication for Authenticator relocation, the system would need to "wake up" the MS, execute a complex EAP authentication protocol, and then release the MS back into Idle. This operation will strain the MS and system resources.

Figure 2:
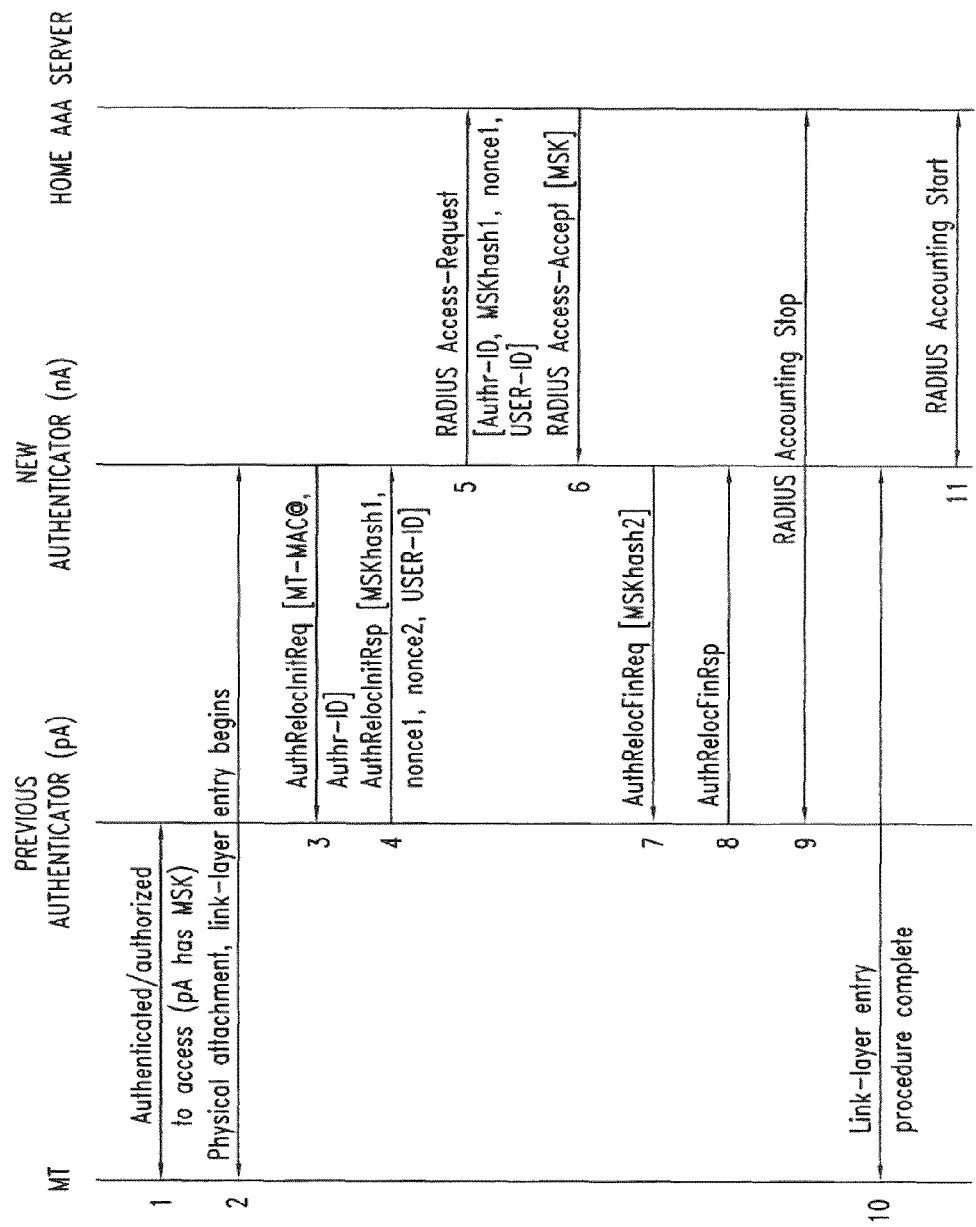
FIG. 2 shows a flow sequence for authentication according to a conventional method.

A method has been provided in the art for Authenticator shifting without conducting re-authentication. The essence of that approach is shown on FIG. 2 and is summarized below:

The MS recognizes that it has roamed into another ASN by, for instance, analyzing received indications from an overlaying serving network about the present Paging Area, and therefore knows that it needs to update its registered location. Alternatively, the MS may decide to access the new ASN to request a session. In either case, the MS sends a Ranging Request, RNG-REQ, to the closest Base Station BS in the area.

The RNG-REQ message from the MS is received by the Base Station BS and needs to be validated. To implement that function, the BS needs to request the access security key AK from the current Anchor Authenticator that serves this MS. As depicted in step 2 of FIG. 2, the BS typically relays this request over the R6 interface (between BS and ASN-GW) to the local ASN-GW, which becomes a new Target Authenticator (depicted nA, for "New Authenticator") for the MS, to be differentiated from the current Anchored Serving Authenticator (depicted pA, for "Previous Authenticator") associated with the ASN previously serving the MS.

The nA recognizes that the MS is registered in another ASN, and that its security association is anchored in the pA. As depicted in step 3 of FIG. 2, the nA forwards the request to the pA over the R4 interface.

The current Authenticator for the MS, pA, generates two nonces, Nonce1 and Nonce2. The pA then uses the MSK and the Nonce 1 in addition to the identity of the nA to create a message (token) Relocation Request Token shown in step 4 of FIG. 2 as MSKhash1. This Relocation Request Token is delivered to the new Target Authenticator nA in step 4, and forwarded by the nA to the HAAA over the R3/R5 interface in step 5.

The HAAA validates this Token as a proof that the pA (which currently possesses the secret MSK) agrees to transfer its Authenticator responsibilities to the nA.

The HAAA also checks local policy stored in PF to verify that the nA is authorized to perform Authenticator duties for the current MS session, and is trusted enough to receive the same MSK. In such case the HAAA sends the current active MSK to the nA in step 6.

Upon receiving the MSK, the nA computes the Relocation Authorization Token MSKhash2 using the received MSK and Nonce2. The token MSKhash2 is then sent to the pA, in step 7, as the proof that the nA is now in possession of the MSK, and that HAAA has authorized the Authenticator transfer.

In step 8, the AuthRelocFinResp message closes the transaction initiated by the message of step 7. In effect, the AuthRelocFinResp message lets the nA know that the pA validated and accepted the MSKHash2, is satisfied with it, and treats it as a proof that the nA with the AAA authorization is now in possession of the valid MSK. In other words, the Authenticator Relocation can now be concluded.

Subsequent Accounting Stop from the pA (step 9) and Accounting Start from the nA (step 11) indicate to the HAAA that Authenticator relocation is completed successfully.

The above-described prior-art procedure suffers from several deficiencies as described below:

Both Nonce1 and Nonce2 are generated as random numbers by the same entity, pA, and cannot be verified by any other network entity for freshness. That is, neither nA nor HAAA can verify that presented random Nonce1 or Nonce2 has not been used before. Therefore, there is no guarantee of replay protection for the Authenticator relocation transaction. As a result, a rogue ASN-GW can repeat the Relocation Request Token in a request to the HAAA, and receive the MSK even if the MS is served elsewhere. Possession of the MSK would allow such a rogue ASN-GW to eavesdrop on the MS session, and even deny its service in another system.

The prior-art protocol described above assumes that the R4 interface is protected by Transport Layer security measures, with the result that the pA and nA Authenticators can not masquerade or spoof their identities. This assumption is not warranted, as a rogue ASN-GW can insert itself as the Man-in-the-Middle R4 entity between pA and nA, cache the Relocation Request Token, and reuse it at a later time for obtaining the MSK.

Reusing the same MSK in more than one ASN increases the scope of MSK vulnerability, as the compromised ASN-GW can not only decrypt current MS traffic, but also all previous and future data of this MS for the whole duration of the MSK validity.

Figure 3:
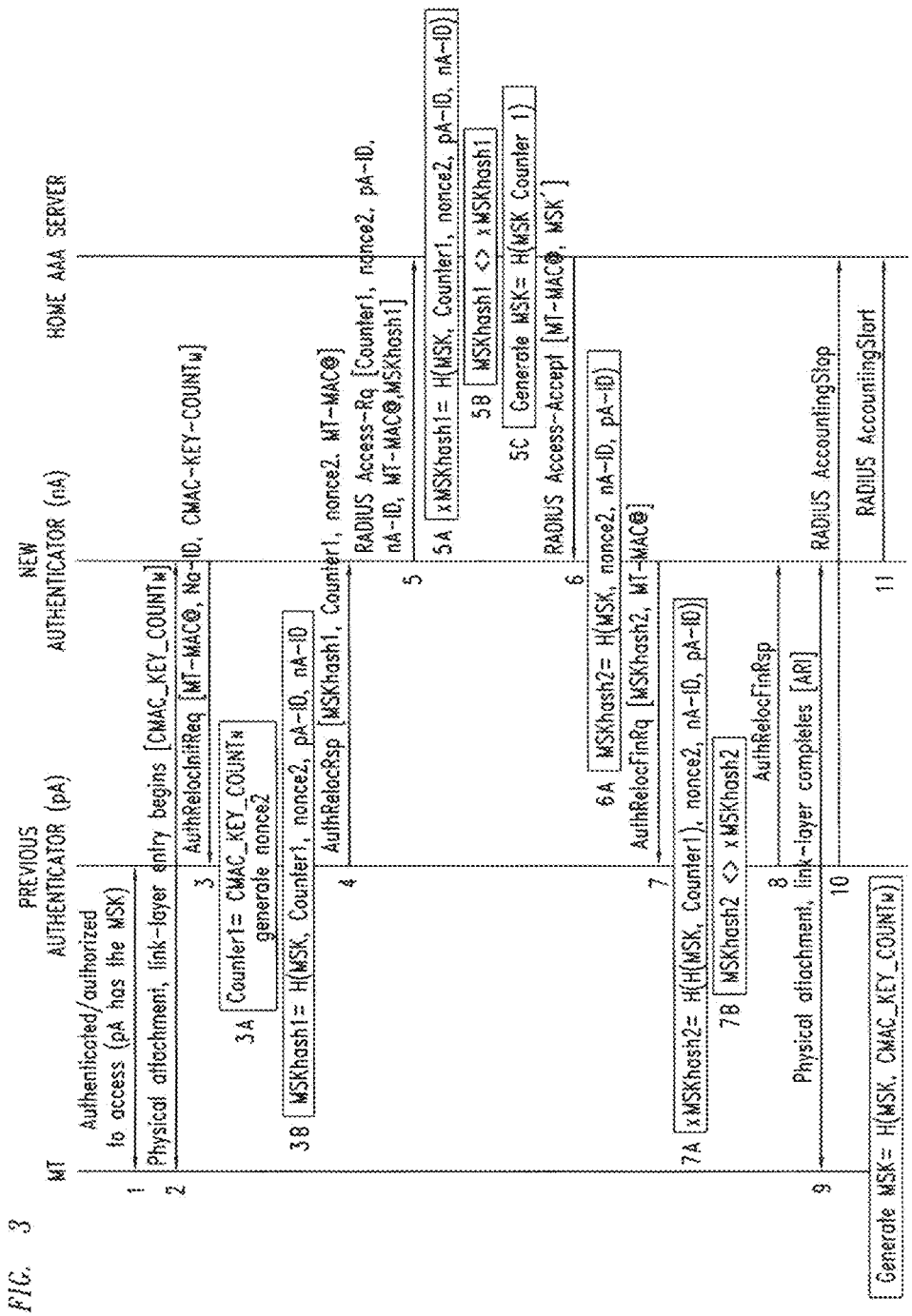
FIG. 3 shows a flow sequence for authentication according to an embodiment of the invention.
Figure 4:
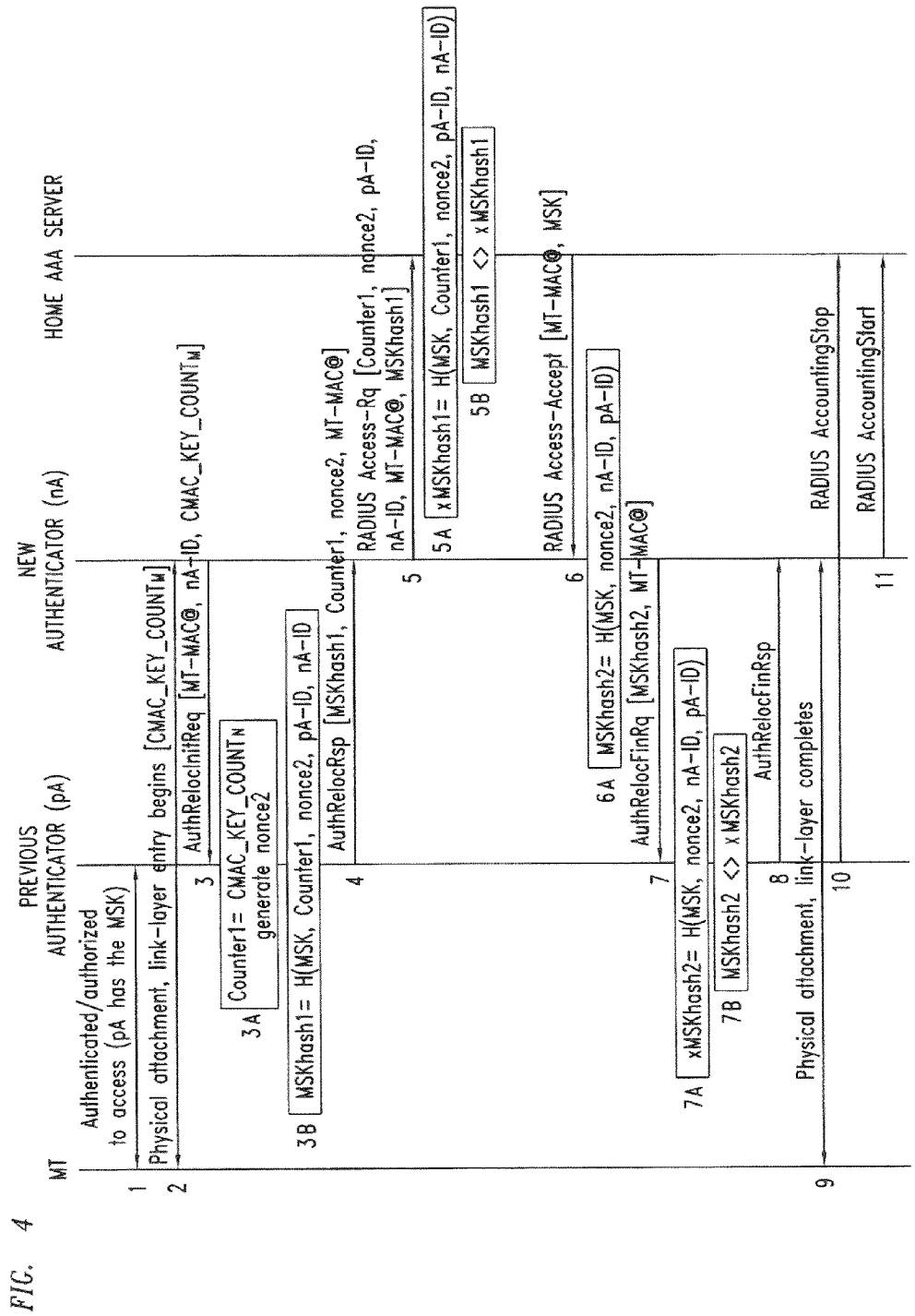
FIG. 4 shows a flow sequence for authentication according to another embodiment of the invention.

The inventor discloses herein several modifications to the prior art methodology that address the problems identified in that approach. These modifications are shown in FIGS. 3 and 4, which depict two illustrative embodiments of the invention, and described below. Note that steps unchanged from the FIG. 2 flow diagram are generally not repeated in the discussion below of FIGS. 3 and 4.

Specifically,

In step 3a, a new variable, Counter 1, based on an ever-increasing counter, is generated at the pA (as a replacement for the random nonce Nonce1), along with Nonce 2, to create the Relocation Request Token.

Advantageously, such a counter already exists in the WiMAX/IEEE 802.16e system, and it is defined as the CMAC_KEY_COUNT counter described in Sec.4.3.4 of the standard [WMF-T33-001-R010v04_Network-Stage3-Base]. This CMAC-KEY-COUNT is currently used for a replay protection of management messages on the Air Interface, and is maintained by the MS (CMAC_KEY_COUNT$_M$). and Anchor Authenticator pA (CMAC_KEY_COUNT$_N$). The CMAC_KEY_COUNT$_M$ is included in the Physical Attachment message (RNG-REQ, LU-REQ) sent by the MS to the serving Base Station.

This CMAC_KEY_COUNT$_M$ is forwarded by the serving BS to the nA over the R6 interface during the step 2 transaction of FIGS. 3 and 4, and relayed by the nA to the pA over the R4 interface in a step 3. In normal operation, the pA will compare the received CMAC_KEY_COUNT$_M$ with the locally maintained CMAC_KEY_COUNT$_N$ and select the larger value as an active value of the CMAC_KEY_COUNT$_N$.

The pA can now use the CMAC_KEY_COUNT$_N$ in step 3a as the Counter1 parameter in computing the Relocation Request Token.

As shown in the step 3b, values of MSK, Counter1, Nonce2, and pA-ID and nA-ID are included in computation of the Relocation Request Token to ensure proper binding of entities involved in the relocation transaction, where pA-ID is the ID of the pA and nA-ID is the ID of the nA. This measure prevents possible identity spoofing by a rogue ASN-GW.

The Relocation Request Token, pA-ID, nA-ID, Counter1, and nonce2 are delivered to the new Authenticator nA in step 4, and forwarded by the nA to the HAAA in step 5.

The HAAA recognizes that, according to the requirements defined in Sec.4.3.4 of the WiMAX standard [WMF-T33-001-R010v04_Network-Stage3-Base], at the time of successful EAP authentication the CMAC_KEY_COUNT$_N$ is reset to value 1, and incremented with every successful MS entry into the network. The HAAA is also aware that, pursuant to the method of the invention, the pA sets the Counter1 value to be equal to the current maintained value of the CMAC_KEY_COUNT$_N$, which must be larger than 1 and larger than any other previously received value of Counter1, until the next re-authentication. Any violation of this check indicates a replay of the Relocation Request Token, and must be rejected.

After evaluating the value of Counter 1 against the tests of the prior section (in step 5a), and finding the Counter 1 value acceptable, the HAAA validates the Relocation Request Token (in step 5b).

As noted above, two illustrative embodiments of the invention are depicted by FIGS. 3 and 4. To this point, operation of the two embodiments are the same in both figures, and such common operation has been described above for both figures. Hereafter, however, invention operation for the two embodiments diverges somewhat and they are separately described in respect to FIG. 3 and FIG. 4.

In the embodiment depicted in FIG. 3, the HAAA generates a fresh version of the MSK, denoted MSK', by using the Counter1 as the freshness parameter, as shown in step 5c, to generate MSK' as a hash of MSK and Counter 1.

The MSK' is then delivered to the nA from HAAA in step 6.

The nA computes the Relocation Authorization Token in step 6a using the MSK' and returns this Token to the pA, (in step 7) as a proof of possession of MSK'.

The pA evaluates the Relocation Authorization Token in step 7a, validates in step 7b and completes the Authenticator Relocation in step 8.

The Authenticator Relocation Indicator (ARI) is sent to the MS in a transaction of step 9, indicating that physical attachment or location update is completed, and additionally, the MSK is refreshed. Using this indication, the MS re-computes the MSK using its current value and the CMAC_KEY_COUNT$_M$ as the freshness parameter.

It should be noted that, if the value of the CMACKEY_COUNT$_M$ was smaller than the CMAC_KEY_COUNT$_N$ maintained at the pA, the MS would not have been admitted into the network. If the CMAC_KEY_COUNT$_M$ was equal or larger than previously maintained CMAC_KEY_COUNT$_N$, the pA would have updated its CMAC_KEY_COUNT$_N$ to be in sync with the CMAC_KEY_COUNT$_M$ initially reported by the MS. And therefore, the values of CMAC_KEY_COUNT in the MS, pA, and HAAA are at this point fully synchronized. As a result, the MSK' computed by the MS, pA, and HAAA are the same.

Subsequent RADIUS Accounting Stop from the pA (step 10) and Accounting Start from the nA (step 11) indicate to the HAAA that Authenticator Relocation is completed.

At this point, the MS, the HAAA, and the nA can declare the new MSK=MSK' to be active, and the pA can delete the old MSK.

In an alternative embodiment depicted in FIG. 4, operation of the invention proceeds without generation of a new MSK. Thus, for this embodiment, the HAAA does not generate a fresh value of the MSK, MSK' (as depicted in step 5c of FIG. 3), but instead returns the current valid MSK to the nA (step 6 of FIG. 4).

The nA computes the Relocation Authorization Token in step 6a using the MSK and returns this Token to the pA, in step 7, as a proof of possession of MSK.

The pA evaluates the Relocation Authorization Token in step 7a, validates in step 7b, and completes the Authenticator Relocation in step 8.

The Ranging Response RNG-RSP is sent to the MS in a transaction of step 9, indicating that physical attachment or location update is completed without modification of the MSK.

In summary, the modified Authenticator Relocation procedure of the invention methodology, as described herein, provides replay protection and mitigates the rogue ASN-GW problem during relocation of the Anchor Authentication, and without conducting re-authentication of the MS, while optionally allowing secure refresh of the MSK.

Herein, the inventors have disclosed a method for supporting mobility of a roaming mobile terminal from one serving system to another, with relocation of the Authenticator function, but without the need for Re-authenticating the mobile terminal, that provides significant improvements in network security over methods of the art. Numerous modifications and alternative embodiments of the invention will be apparent to those skilled in the art in view of the foregoing description.

Accordingly, this description is to be construed as illustrative only and is for the purpose of teaching those skilled in the art the best mode of carrying out the invention and is not intended to illustrate all possible forms thereof. It is also understood that the words used are words of description, rather that limitation, and that details of the structure may be varied substantially without departing from the spirit of the invention, and that the exclusive use of all modifications which come within the scope of the appended claims is reserved

The invention claimed is:

1. A method for relocating an authentication for a user from a first authentication server to a second authentication server, the method comprising:
   receiving a token at the second authentication server;
   evaluating the token, at the second authentication server, to determine a validity of a request associated with the token by verifying an identity of the first authentication server and comparing a counter value in the token with a counter value from a prior session with the first authentication server, the token being a function of at least the counter value from the prior session, the identity of the first authentication server and a first master session key (MSK); and.
   receiving an indication at the second authentication server that the authentication relationship for the user has been relocated to the second authentication server, if the second authentication server possesses the first MSK.

2. The method of claim 1 wherein the second authentication server is configured to receive the counter value from an associated server and the counter value is initially generated for a function other than authentication.

3. The method of claim 1, wherein further comprising:
   generating a second MSK at the second authentication server as a function of the counter value and the first MSK.

4. The method of claim 3 wherein the second authentication server receives the token as an authenticated user moves to establish an authentication relationship with the second authentication server.

5. The method of claim 4, further comprising:
   generating a second token indicating that the second authentication server is in possession of the first MSK; and
   forwarding the second token to the first authentication server.

6. The method of claim 5 wherein the second token is generated as a function of the counter value and the first MSK.

7. The method of claim 5 wherein the second token is generated as a function of the counter value and the second MSK.

8. The method of claim 5, further comprising:
   establishing the authentication relationship between the user and the second authentication server, if the second token indicates that the second authentication server entity possesses the first MSK.

9. A method for transferring an authentication relationship for a user from a first authentication entity to a second authentication entity comprising:
   generating, at the first authentication entity, a first token as a function of a Master Session Key (MSK), a counter value, an identity of the first authentication entity and an identity of the second authentication entity;
   sending the first token from the first authentication entity to the second authentication entity, the first token indicating that the first authentication entity agrees to transfer the authentication relationship for the user to the second authentication entity;
   sending the first token from the second authentication entity to an authentication server, along with an indicia of identity for the second authentication entity;
   evaluating the first token for authentication at the authentication server by verifying the identity of the first authentication entity and the identity of the second authentication entity and comparing the counter value in the first token with a counter value from a prior session with the first authentication entity;
   generating a second token at the second authentication entity as the function of the MSK and the counter value, if the first token is authenticated, the second token indicating that the second authentication entity is in possession of the MSK;
   forwarding the second token from the second authentication entity to the first authentication entity;
   evaluating the second token at the first authentication entity to determine if the second authentication entity possesses the MSK; and
   transferring the authentication relationship for the user from the first authentication entity to the second authentication entity, if the second authentication entity possesses the MSK.

10. The method of claim 9 wherein the counter value is provided from an associated entity and is initially generated for a function other than authentication.

11. A method for transferring an authentication relationship for a user from a first authentication entity to a second authentication entity comprising:
    generating, at the first authentication entity, a first token as a function of a first Master Session Key (MSK), a counter value, an identity of the first authentication entity and an identity of the second authentication entity;
    sending the first token from the first authentication entity to the second authentication entity, the first token indicating that the first authentication entity agrees to transfer the authentication relationship for the user to the second authentication entity;
    sending the first token from the second authentication entity to an authentication server, along with an indicia of identity for the second authentication entity;
    evaluating the first token for authentication at the authentication server by verifying the identity of the first authentication entity and the identity of the second authentication entity and comparing the counter value in the first token with a counter value from a prior session with the first authentication entity,
    generating a second MSK value by the authentication server as a function of the first MSK value and the counter value;
    generating a second token as a function of the second MSK value at the second authentication entity and the counter value, if the first token is authenticated by the authentication server;
    forwarding the second token from the second authentication entity to the first authentication entity;
    evaluating the second token at the first authentication entity and transferring the authentication relationship for the user from the first authentication entity to the second authentication entity.

12. The method of claim 11 wherein the counter value is provided from an associated entity and is initially generated for a function other than authentication.

13. The method of claim 11, further comprising replacing the first MSK value with the second MSK value.

14. A method of obtaining an authentication relationship for a user at a second authentication entity, the method comprising:
    receiving a first token at the second authentication entity indicating that a previous authentication entity agrees to transfer the authentication relationship for the user, the first token being a function of a Master Session Key (MSK), a counter value, an identity of the previous authentication entity and an identity of the second authentication entity;

receiving an indication that the first token is authentic at the second authentication entity, the first token being authentic if the counter value contains an expected value and the identity of the previous authentication entity and the identity of the second authentication entity are verified, generating a second token at the second authentication entity as a function of the MSK and the counter value, if the first token is authentic, the second token indicating that the second authentication entity is in possession of the MSK;

forwarding the second token from the second authentication entity to the previous authentication entity; and receiving, at the second authentication entity, an indication that the authentication relationship for the user has been relocated to the second authentication entity, if the second authentication entity possesses the MSK.

15. The method of claim 14 wherein the counter value is generated for a function other than authentication.

* * * * *